United States Patent
De Frenne (10) Patent No.: US 6,286,641 B1
(45) Date of Patent: Sep. 11, 2001

(54) OIL BRAKE (75) Inventor: Pierre De Frenne, Montauban (FR)

(73) Assignee: Donerre Amortisseur, Montauban (FR)

( * ) Notice: Subject to any disclaimer, the term of this patent is extended or adjusted under 35 U.S.C. 154(b) by 0 days.

(21) Appl. No.: 09/090,187

(22) Filed: Jun. 4, 1998

(30) Foreign Application Priority Data

Jun. 5, 1997 (FR) .................................................. 97 06957

(51) Int. Cl.[7] ...................................................... F16F 9/34
(52) U.S. Cl. ........................ 188/319.2; 188/318; 188/314
(58) Field of Search .................... 188/314, 297, 188/318, 319.1, 319.2, 299.1, 300, 299.2

(56) References Cited

U.S. PATENT DOCUMENTS

| 4,958,706 | 9/1990 | Richardson et al. . | |
|---|---|---|---|
| 5,094,325 | * 3/1992 | Smith | 188/314 |
| 5,810,128 | * 9/1998 | Eriksson et al. | 188/319.2 |

FOREIGN PATENT DOCUMENTS

| 901 139 | 1/1954 | (DE) . | |
|---|---|---|---|
| 2 736 697 | 1/1997 | (FR) . | |
| 972311 | 10/1964 | (GB) . | |
| 1 411 218 | 10/1975 | (GB) . | |
| 2 239 073 A | 6/1991 | (GB) . | |
| 2239073 | * 6/1991 | (GB) | 188/319.2 |
| 0046912 | * 2/1988 | (JP) | 188/314 |
| 0312533 | * 12/1988 | (JP) | 188/314 |

* cited by examiner

Primary Examiner—Robert J. Oberleitner
Assistant Examiner—Devon Kramer
(74) Attorney, Agent, or Firm—Nixon & Vanderhye (57) ABSTRACT

This invention pertains to an oil brake that includes a piston (3) which is mounted on the free end of a movable tubular rod (4) that moves in a hollow cylindrical body (2), limiting, on both sides of the piston, a first working volume (21) and a second working volume (22), whereby a central rod (34) is arranged inside of tubular rod (4), whereby tubular rod (4) has at least one lateral opening (24) that connects second working volume (22) to first working volume (21) via a central passage (25) that is made between tubular rod (4) and central rod (34) and is formed by a relative difference in transverse dimensions between central rod (34) and the inside diameter of tubular rod (4), whereby opening or openings (24) are formed on tubular rod (4) at a distance from piston (3) that is essentially equal to at least half the thickness of the piston, whereby the end of hollow cylindrical body (2) is tightly closed by a plug and/or a stem guide (5) that is designed in such a way that, before the end of the expansion stroke, openings (24) that are formed on tubular rod (4) are tightly sealed by the inside wall of stem guide (5) before all of the oil is evacuated from second working volume (22) toward first working volume (21), in order to form a pocket of oil that is thick enough to constitute a hydraulic cushion for piston (3).

11 Claims, 4 Drawing Sheets

OIL BRAKE

BACKGROUND OF THE INVENTION

This invention pertains to an oil brake for vehicles such as all-terrain bikes, motor bikes, cars and the like.

From document U.S. Pat. No. 4,958,706 an oil brake is known in which, during compression, the piston expels the oil from a first working volume of the cylinder toward, on the one hand, a second working volume of the cylinder and, on the other, toward a backup chamber to the outside of which a gas is applied. During expansion, the oil moves from the second working volume and from the backup chamber toward the first working volume. The movable rod that holds the piston is tubular and contains a central rod that projects beyond the movable rod into the first working volume. At its end that is integral with the piston, the tubular rod has an inside diameter that is larger than the outside diameter of the central rod so as to form a central passage for the oil. A valve that is essentially shaped like a hat and is equipped with longitudinal slots is located in the opening of the tubular rod. The edge of the hat that is formed by the valve is superimposed on a heat-expanding stop valve and rests on the edge of the end of the tubular valve. The valve and the heat-expanding stop valve are kept resting on the end of the tubular rod in order to block the central passage by means of an open coil spring that is mounted on the central rod and rest on a washer that is integral with the latter. During expansion, the oil passes through an opening that is located in the cylindrical rod at the base of the piston into the second working volume, and then runs via the central passage around the hat-shaped valve and around the heat-expanding stop valve. The oil then moves into the first working volume through lateral openings that are located in the body of the piston and through an opening that is located in the end of a hat that is integral with the piston and surrounds the end of the central rod that projects into the first working volume. Control of the flow during expansion is accomplished by the two regulators that are the hat-shaped valve and the heat-expanding stop valve. Control of expansion at low oil speeds is accomplished by the heat-expanding stop valve, while control at high speeds is ensured by the openings on the hat-shaped valve. The pressure of the open coil spring can be adjusted by screwing down/unscrewing the central rod in the tubular rod, but the attachment end of the brake on the wheel axle must first be disassembled.

This kind of brake does not ensure adequate control of expansion, however. Thus, at high speed and at the end of its stroke, the piston may knock up against the bottom of the cylindrical body of the brake. Moreover, the system consisting of the stop valve and valve does not make it possible to control the start of expansion adequately since the flow of oil is released abruptly. In addition, the double mechanism for controlling the flows of oil during expansion at high and low speeds involves a significant number of complex parts which increase the cost of the brake; this is especially disadvantageous in the case of a brake for a bike, for example.

BRIEF SUMMARY OF THE INVENTION

A first object of the invention is to propose an oil brake that ensures better control of the flow of oil during run-out, thereby remedying the drawbacks of the prior art.

This object is achieved by virtue of the fact that the oil brake includes a piston that is mounted at the free end of a movable tubular rod which at its other end is integral with the stem of the brake, whereby the tubular rod moves in a hollow cylindrical body, thereby delimiting on both sides of the piston a first and a second working volume, whereby a central rod is arranged inside of the tubular rod and the tubular body contains at least one lateral opening that connects the second working volume to the first working volume via at least one central passage that is made between the tubular rod and the central rod and is formed by a relative difference in transverse dimensions between the central rod and the inside diameter of the tubular rod, whereby the opening or openings are formed on the tubular rod at a distance from the piston that is equal to at least half of the thickness of said piston, whereby the hollow cylindrical body is tightly closed with a plug and/or stem guide that is designed in such a way that, before the end of the expansion stroke, the openings that are formed on the tubular rod are tightly sealed by the inside wall of the stem guide before all of the oil is evacuated from the second working volume toward the first working volume, forming a pocket of oil that is thick enough to constitute a hydraulic cushion for the piston.

According to another feature, the tubular rod contains four openings that connect the second working volume to the first working volume and are located at a distance from the adjacent base of the piston that is essentially equal to the thickness of the piston, whereby the central passage is formed by a reduction in the diameter of the central rod at its end that empties into the first working volume.

According to another feature, the end of the hollow cylindrical body is closed by a stem guide whose length is essentially equal to twice the thickness of the piston.

Another object of the invention is to propose an oil brake that makes it possible to ensure easy adjustment of the opening pressure of the expansion valve without disassembling the brake.

This object is achieved by virtue of the fact that the end of the central rod of the brake extends beyond the tubular rod in the first working volume, whereby an expansion non-return check valve is mounted at the end of the central rod that protrudes into the first working volume and is equipped with a head that forms a support for the elastic means that exert a pressure on the non-return valve in such a way as to support the latter on the seat of a perforation that is located at the end of the tubular rod which is integral with the piston in order to block the outlet opening of the central passage toward the first working volume, and whereby remote-control means that are located close to the end of the tubular rod that is integral with the brake stem make it possible for the central rod to translate with respect to the tubular rod in order to adjust the pressure that is exerted by the elastic means on the expansion valve without disassembling the brake.

According to another feature, the expansion stop valve is essentially shaped like a cylindrical tube that is equipped with a radial shoulder that runs from one of its ends to the other, whereby the expansion stop valve is attached to the central rod and can slide in a supplementary cylindrical seat that is formed at the end of the tubular rod that is integral with the piston, whereby the translation of the expansion stop valve toward the inside of the tubular rod is limited by the stop of the radial shoulder of the stop valve on the edge of the end of the tubular rod and seals the outlet opening of the central passage toward the first working volume, whereby the expansion stop valve is equipped with at least one notch that is located in a plane which contains the longitudinal axis of symmetry of the stop valve and has a depth that decreases from the end facing the shoulder toward the shoulder itself, ensuring a gradual enlargement of the outlet opening of the central passage for the first working volume when the translation of the expansion stop valve takes place in the direction of its outlet toward the cylindrical seat of the end of the tubular rod.

According to another feature, the end of the central rod protrudes beyond the tubular rod in the body of the brake stem and includes an additional transverse bore of an adjustment shaft, whereby the adjustment shaft is seated simultaneously in a transverse seat that is formed in the body of the brake stem and in the bore of the central rod, whereby the transverse seat of the body of the brake stem is shaped in such a way as to permit limited translation of the adjustment shaft in the direction of the longitudinal axis of symmetry of the central rod, whereby the two ends of the adjustment shaft protrude on both sides of the body of the brake stem, whereby the brake stem has threading on its periphery that is designed to ensure the screwing-in of a roller plug that is essentially shaped like a ring, and whereby the adjustment shaft is made integral with the roller plug by blocking means, such that the screwing and unscrewing of the roller plug on the body of the brake stem ensure the adjustment of the position of the shaft in its seat with respect to the tubular rod that is mounted in such a way as to be fixed in terms of translation on the body of the brake stem in order to regulate the pressure that is exerted by the elastic means on the expansion stop valve.

According to another feature, the roller plug is equipped on its periphery with threading that is designed to make it possible to screw on an essentially ring-shaped adjustment roller that constitutes the means of blocking the adjustment shaft, whereby the adjustment shaft and roller plug are shaped in such a way that the screwing of the adjustment roller on the roller plug makes it possible to block the end of the adjustment shaft between the adjustment roller and the roller plug.

According to another feature, on its face that is opposite the first working volume the piston has a protrusion that is essentially tubular and is concentric with respect to the opening of the piston that is provided for the assembly consisting of the tubular rod and central rod, whereby the tubular protrusion is designed to regulate the flow of oil moving through the central passage that is located between the tubular rod and central rod during expansion in order to ensure better control of the latter.

According to another feature, during compression the piston expels oil from the first working volume toward, on the one hand, the second wording volume through passages that are located in the piston body and are sealed by a deformable washer and, on the other hand, toward a deformable backup chamber to the outside of which a gas is applied, whereby the oil is evacuated toward the backup chamber through at least two adjustable openings, each of which operates at a different piston stroke speed and whereby the openings are arranged between an intermediate chamber of a specified volume and the backup chamber.

According to another feature, oil is evacuated toward the backup chamber through three adjustable openings, with a first opening being sealed by a first non-return stop valve that can be adjusted in such a way as to keep oil from being evacuated except in the case where the pressure exerted by the piston on the oil exceeds the most extreme nominal service conditions of the vehicle, whereby a second opening is sealed by a second non-return stop valve that is adjusted for a piston stroke speed plateau that is between the low speeds and the hydraulic brake speeds, and whereby a third opening is equipped with an adjustable throttle that makes it possible to evacuate the oil at low speeds.

According to another feature, the piston is screwed on a threaded portion that is located essentially at the end of the movable tubular rod, whereby the deformable non-return washer is locked onto one end of a rigid pre-loading washer that rests on a radial shoulder that is formed on the body of the movable tubular rod, whereby the face of the pre-loading washer that is opposite the non-return washer is essentially convex in order to allow the non-return washer to deform during the compression of the brake, in such a way as to ensure that the latter comes to rest on the pre-loading washer.

According to another feature, the deformable backup chamber is located in a reservoir that is attached to the hollow cylindrical body of the brake by means of a rigid connector.

BRIEF DESCRIPTION OF THE DRAWING FIGURES

Other features and advantages of this invention will become more readily apparent from reading the description given below, which refers to the attached drawings, where.

DETAILED DESCRIPTION OF A PREFERRED EMBODIMENT

The invention will now be described with reference to FIGS. 1–5. In the preferred embodiment of the invention, which is by no means limiting, the oil brake includes a hollow cylinder (2) in which a piston (3) that is mounted on a first end of a movable tubular rod (4) moves. The end of hollow cylindrical body (2) is tightly closed by a plug and/or stem guide (5). The second end of movable tubular rod (4) is integral with a brake stem (35) that forms a lug. A stop washer (29) is integral with brake stem (35). The end of cylinder (2) that faces the lug of brake stem (35) also includes a lug (28) for attachment to the vehicle. As it moves in hollow cylinder (2), movable tubular rod (4) delimits a first working volume (21) and a second working volume (22) on both sides of piston (3). During compression, piston (3) expels the oil from first working volume (21) toward, on the one hand, second working volume (22) through passages (39) that are located in the body of piston (3) and are sealed by a deformable non-return washer (50) and, on the other hand, toward the deformable backup chamber (10) to the outside of which a gas (11) is applied. Deformable backup chamber (10) may be located in a hollow reservoir (7) that is mounted on hollow cylindrical body (2) of the brake by means of a rigid connector (6). Reservoir (7) may be cylindrical and may be closed at its end by a plug (8) on which is mounted a valve (27) for admitting gas into the reservoir. Deformable backup chamber (10) of reservoir (7) that contains the oil may be separated from the volume that contains gas (11), which is, e.g., nitrogen, by means of a movable divider piston (9). The oil is evacuated toward backup chamber (10) through an opening. In the preferred embodiment shown in FIG. 1, the oil is evacuated towards backup chamber (10) through two adjustable openings (13, 14), each of which operates at a different stroke speed of piston (3). Two openings (13, 14) may be arranged between an intermediate chamber (12) of a specified volume and backup chamber (10). A first opening (13) makes it possible, for example, to evacuate the oil at low speed, while a second opening (14) can evacuate the oil at high speed. For example, first opening (13) may be in the shape of a truncated cone and may be adjustably sealed by an operator with the aid of a low-speed check screw (26). As for second opening (14), it may be sealed by an adjustable non-return stop valve (214) For example, non-return stop valve (214) that seals second opening (14) may be an adjustment screw (126) for high speeds that is screwed into the body of the reservoir and protrudes into backup chamber (10). The end of screw (126) that protrudes into backup chamber (10) may be equipped with a retention hat of an elastic means that rests with a specified force on a sealing washer in order to seal second opening (14). Of course, it is possible to provide a brake in which the oil is evacuated toward backup chamber (10) through three different openings, as described in French patent application EN 96 09 329, which was filed by the applicant on Jul. 24, 1996.

Figure 1:
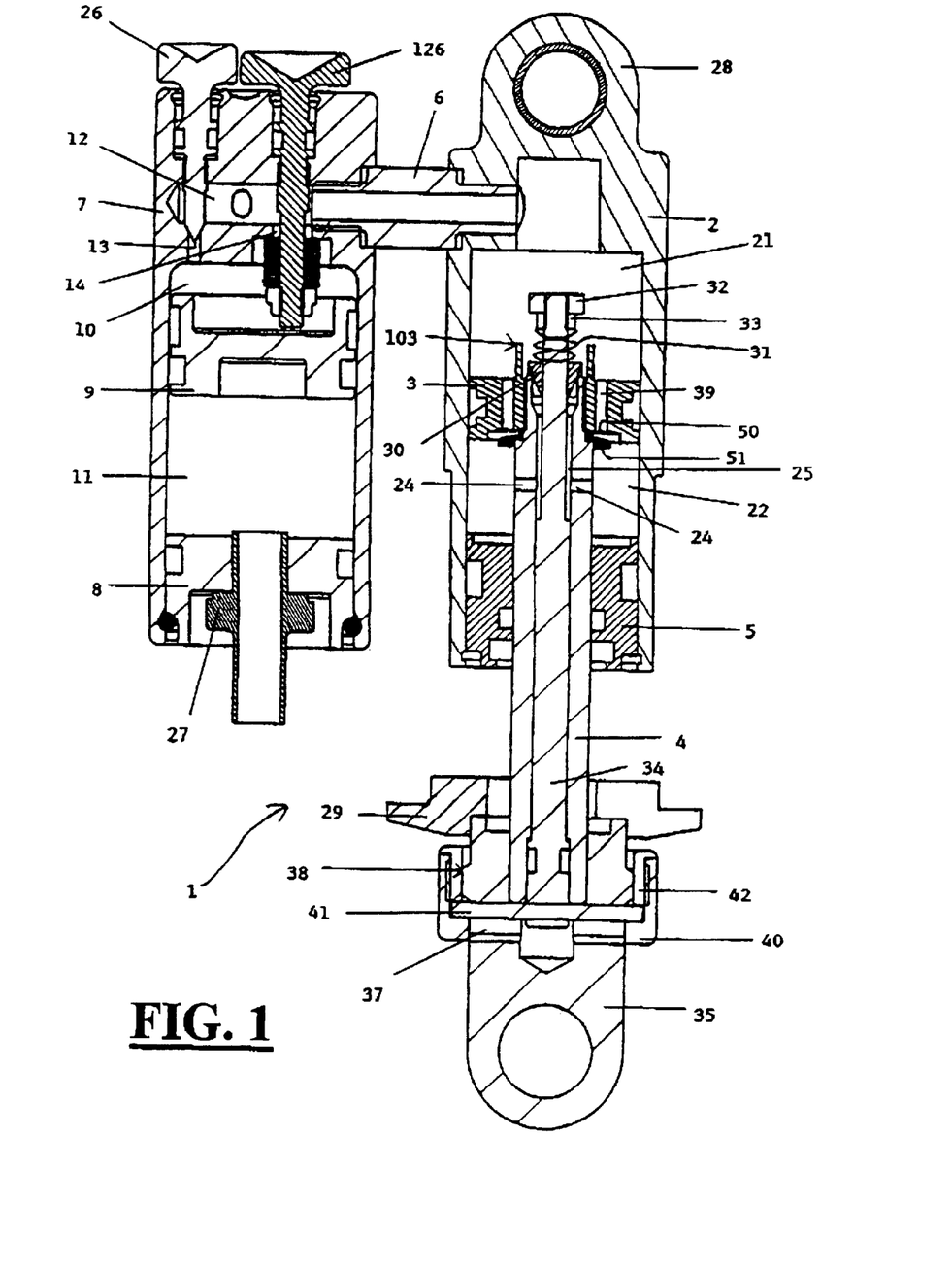
FIG. 1 shows a sectional view of the brake according to the invention.
Figure 2:
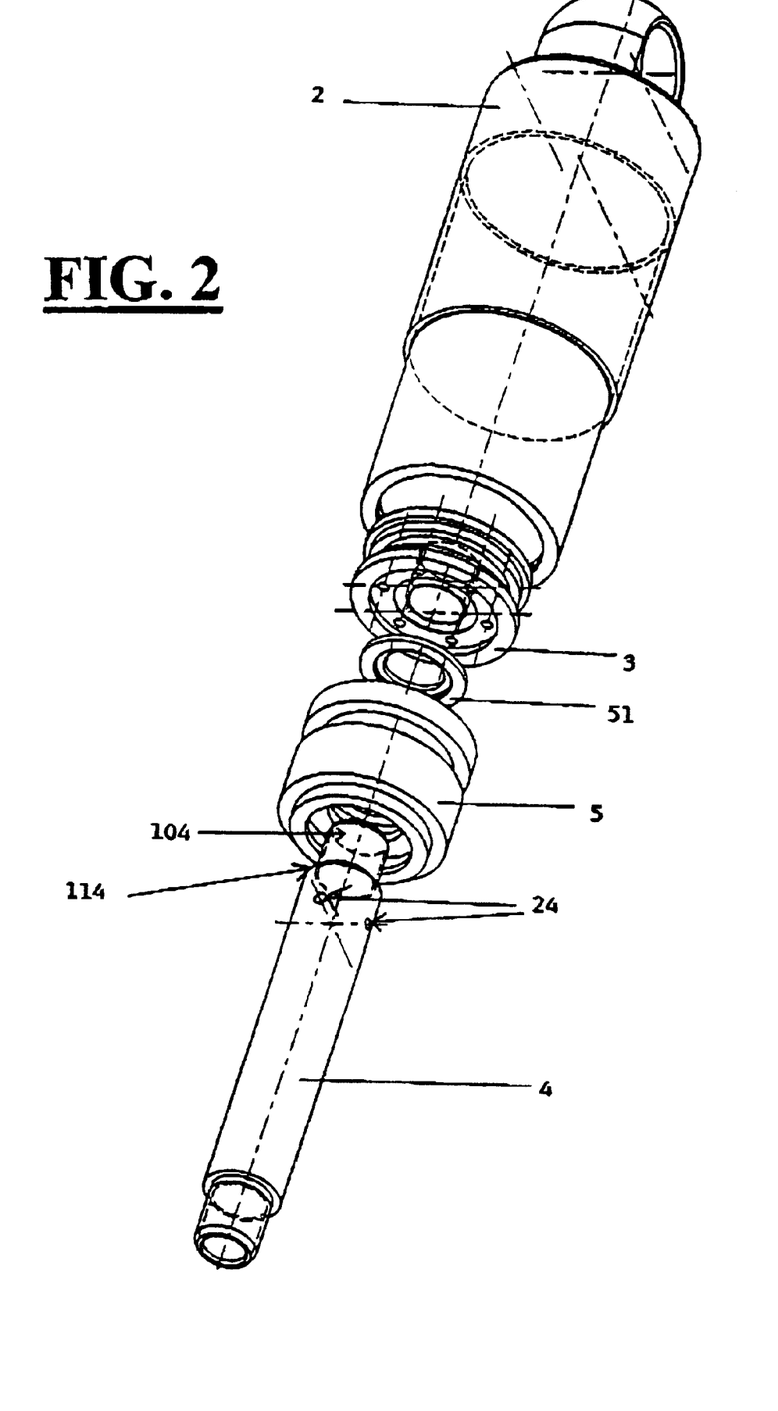
FIG. 2 shows a perspective blow-up view of a portion of the set of parts that constitute the brake of FIG. 1.
Figure 3:
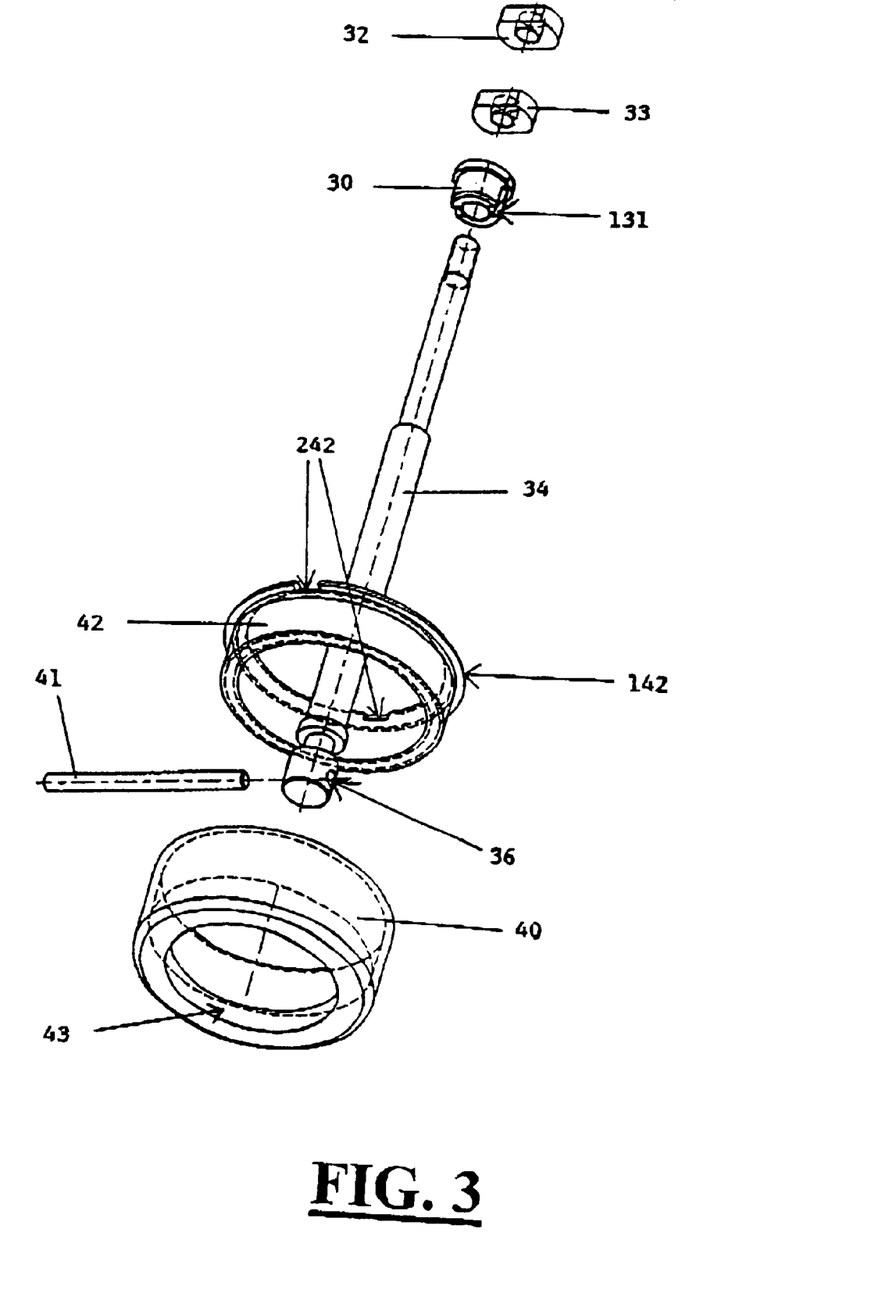
FIG. 3 shows a perspective blow-up view of a portion of the parts that constitute the mechanism for adjusting the expansion of the brake of FIG. 1.
Figure 4:
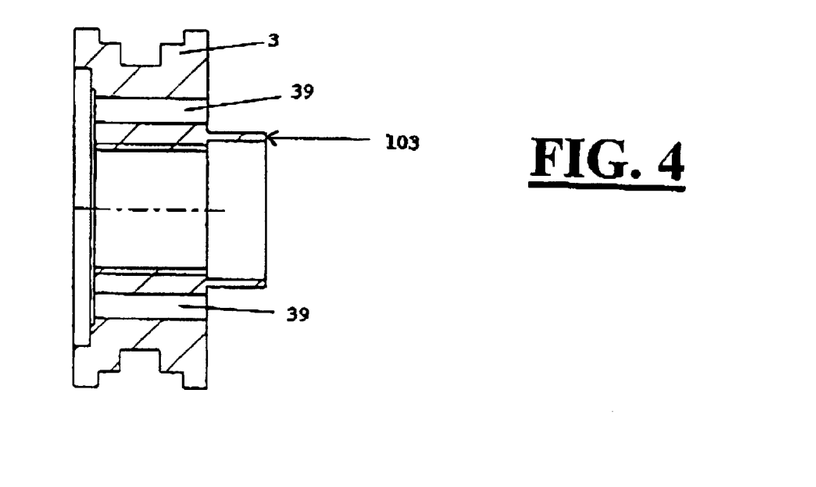
FIG. 4 shows a sectional view of the piston of the brake of FIG. 1.
Figure 5:
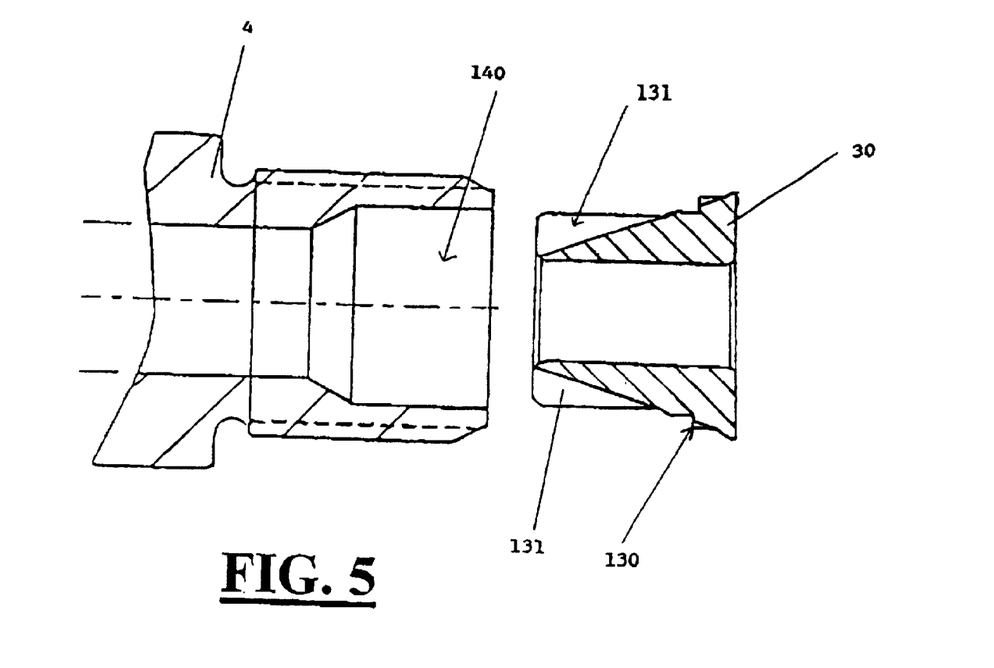
FIG. 5 shows a partial view, blown up and in section, of the movable end of the rod and of the expansion stop valve that is associated with brake of FIG. 1.

Piston (3) may be screwed onto a threaded part (104) that is located at the end of movable tubular rod (4). Non-return washer (50) which deforms upon compression may be, for example, sandwiched between piston (3) and one end of a rigid pre-loading washer (51, FIGS. 1 and 2) that rests on a radial shoulder (114, FIG. 2) that is formed on the body of movable tubular rod (4). Pre-loading washer (51) may be made of, e.g., hardened steel or any other material. Radial shoulder (114) of the body of rod (4) on which pre-loading washer (51) rests may be formed by a difference in diameter between threaded end (104) of movable tubular rod (4) onto which piston (3) is screwed and the central part of said movable tubular rod (4). The face of pre-loading washer (51) that faces towards non-return washer (50) may include a protrusion that forms a ring on which non-return washer (50) is mounted or threaded. Advantageously, the face of pre-loading washer (51) that is opposite non-return washer (50) includes curves and/or slopes that form a convex shape toward non-return washer (50). The convex shape of pre-loading washer (51) allows non-return washer (50) to deform, such that the latter comes to rest on pre-loading washer (51) upon compression. Thus, upon compression, the deformation of non-return washer (50) is limited to a maximum amplitude that is determined by the shape of pre-loading washer (51), thereby restricting the passage for the oil through piston (3). In the embodiment described, piston (3) includes six longitudinal passages (39) that are sealed by deformable non-return washer (50). Six longitudinal passages (39) are distributed at identical angles with respect to one another over a circle that is concentric to the axis of symmetry of piston (3). Piston (3) may be made of titanium or any other equivalent material. In its interior volume, movable tubular rod (4) contains a central rod (34) or expansion rod (34). As it runs out, piston (3) expels the oil from second working volume (22) towards, on the one hand, first working volume (21) and, on the other, toward backup chamber (10). For this purpose, on its periphery movable tubular rod (4) has at least one opening (24) that connects second working volume (22) to first working body (21) by means of at least one central passage (25) that is located between tubular rod (4) and expansion rod (34). Central passage (25) is created by, for example, a relative difference in transverse dimensions between expansion rod (34) and the inside diameter of tubular rod (4). Advantageously, opening or openings (24) are formed on tubular rod (4) at a distance from piston (3) that is equal to at least half the thickness of the latter. Stem guide (5) is shaped in such a way that, before the end of the expansion stroke, openings (24) that are formed on tubular rod (4) are tightly sealed by the inside wall of stem guide (5), whereby this is done before all of the oil is evacuated from second working volume (22) toward first working volume (21) in order to form an oil pocket that is thick enough to constitute a hydraulic cushion for piston (3). Stem guide (5) may be made of an alloy of copper, zinc, and lead, or of any other equivalent material. In a preferred embodiment that is by no means limiting, tubular rod (4) includes four openings (24) that connect second working volume (22) to first working volume (21) via central passage (25). Four openings (24) are at a distance from the adjacent base of piston (3) that is essentially equal to the thickness of the piston. Stem guide (5) that closes the end of cylinder (2) has a length that is essentially equal to twice the thickness of piston (3). In addition, in the embodiment described, central passage (25) is formed by a reduction in the diameter of expansion rod (34) with respect to the inside diameter of tubular rod (4). Of course, on their peripheries divider piston (9), piston (3) which is integral with movable rod (4), plug (8) of reservoir (7), and stem guide (5) have seats for receiving the ring-shaped gaskets. For the sake of simplicity, the majority of the gaskets are not shown in FIG. 1. The end of expansion rod (34) projects beyond tubular rod (4) in first working volume (21). A non-return expansion stop valve (30) is mounted or threaded on the end of expansion rod (34) that protrudes in first working volume (21). Said end of expansion rod (34) that protrudes into first working volume (21) is equipped with a head (32, 33) that provides a support for elastic means that exert pressure on expansion stop valve (30) in such a way as to support the latter on the seat of a perforation or seat (40, FIG. 5) that is formed at the end of tubular rod (4) in order to seal the outlet opening of central passage (25) toward first working volume (21). The head that is formed at the end of expansion rod (34) is composed of a system consisting of nut (32) and counternut (33), which are screwed onto said rod, or of any other equivalent means. Elastic means (31) that exert a pressure on expansion stop valve (30) are composed of, for example, a stack of Belleville washers arranged facing one another, a compression spring, or any other equivalent means. Expansion stop valve (30) may be in the shape of a cylindrical tube that is equipped, at one of its ends, with a radial shoulder (130) towards the outside of the cylinder. Expansion stop valve (30), which is mounted on expansion rod (34), can slide, for example, in a supplementary cylindrical seat (40, FIG. 5) that is formed at the end of tubular rod (4). The translation of expansion stop valve (30) toward the inside of tubular rod (4) is limited by the stop of radial shoulder (130, FIG. 5) of stop valve (30) on the edge of the end of tubular rod (4). Said stop of radial shoulder (130, FIG. 5) of stop valve (30) on the edge of the end of tubular rod (4) also ensures the tight sealing of the outlet opening of central passage (25) toward first working volume (21). Advantageously, expansion stop valve (30) may be equipped on its periphery with at least one recess (131, FIG. 5) that is located in a plane that contains the axis of symmetry of stop valve (30) and has a depth that decreases from the end of stop valve (30) facing shoulder (130) in the direction toward shoulder (130). Longitudinal recess or recesses (131) ensure the progressive enlargement of the outlet opening of central passage (25) toward first working volume (21) during the translation of expansion stop valve (30) in the direction of its outlet outside of cylindrical seat (140) of tubular rod (4). Preferably, and as shown in FIGS. 1 and 3, expansion stop valve (30) has two recesses (131) that are arranged at diametrically opposing positions with respect to the longitudinal axis of symmetry of the stop valve. The brake may be equipped with remote-control means (40, 41, 42) that make it possible for central rod (34) to translate with respect to tubular rod (4) in order to regulate the pressure that is exerted by elastic means (31) on expansion stop valve (30) without disassembling the brake. Said remote-control means (40, 41, 42) are located, e.g., close to the end of tubular rod (4) that is integral with brake stem (35) that forms the lug. Brake stem (35) may be essentially cylindrical. Tubular rod (4) may be made integral with brake stem (35) by screwing its end into the body of the latter, or by any other equivalent means. The end of central rod (34) protrudes beyond tubular rod (4) in the body of brake stem (35) and includes a transverse bore (36) that is provided for an adjustment shaft (41). Adjustment shaft (41) is designed to be housed simultaneously in a transverse seat (37) in the body of brake stem (35) and has a bore (36) of central rod (34). The two ends of adjustment shaft (41) protrude on both sides of brake stem (35). Transverse seat (37) of the body of brake stem (35) is shaped in such a way as to allow limited translation of adjustment shaft (41) in the direction of the longitudinal axis of symmetry of central rod (34). Brake stem (35) includes a threaded part (38) on its periphery that is provided for screwing on a roller plug (42, FIGS. 1 and 3) which is essentially shaped like a cylindrical ring. As shown in FIG. 1, threaded portion (38) of brake stem (35) may be larger in diameter than the rest of the body of brake stem (35). Roller plug (42) is threaded on its cylindrical part and, at one of its ends, has a radial shoulder (142) toward the outside of the cylinder. Roller plug (42) is threaded onto brake stem (35) in such a way that its end that is equipped with a shoulder (142) is situated facing stop washer (29). The threading of roller plug (42) is designed to make it possible to screw an adjustment roller (40) that is essentially cylindrical onto said roller plug. At one of its ends, adjustment roller (40) has a radial shoulder (142) that faces toward the inside of the cylinder and defines an opening with dimensions that correspond to the transverse dimensions of the body of the brake stem (35). Adjustment roller (40) is threaded onto roller plug (42) in such a way that the end of adjustment roller (40) that is situated facing shoulder (43) butts up against shoulder (142) of roller plug (42). Adjustment roller (40) and roller plug (42) are also shaped in such a way that, when adjustment roller (40) is threaded onto roller plug (42), the ends of adjustment shaft (41) are blocked between the end of roller plug (42) and shoulder (43) of adjustment roller (40). Thus, by screwing or unscrewing roller plug (42) on brake stem (35), the operator can move expansion rod (34) with respect to tubular rod (4), which is fixed in terms of translation on brake stem (35), and can thus adjust the compression of elastic means (31) that exert a pressure on expansion stop valve (30). In this way, the operator can very easily adjust the response of the brake to expansion. Adjustment roller (40) and/or roller plug (42) may be equipped with references and/or graduations that make it easier to adjust the expansion. For example, and as shown in FIG. 3, shoulder (142) of roller plug (42) may include two diametrically opposed recesses (242) that are designed to work with a screwing/unscrewing tool of roller plug (42). It is also possible to specify that two recesses (242) work with a graduation that is formed on brake stem (35) and/or on adjustment roller (40) in order to make it easier for the operator to adjust the expansion. Advantageously, on its face situated opposite first working volume (21), piston (3) may have a protrusion (103, FIGS. 1 and 4) that is essentially tubular and concentric with respect to the assembly consisting of tubular rod (4) and central rod (34). Protrusion (103) may be connected to piston (3) by any appropriate means or may be integral with piston (3). Tubular protrusion (103) of piston (3), which is cylindrical for example, is designed to adjust the flow of oil passing through central passage (25) that is located between tubular rod (4) and a central rod (34) during expansion in order to ensure better control of the latter.

Other modifications that are within the grasp of one skilled in the art are also part of the spirit of this invention.

What is claimed is:

1. An oil brake comprising a piston, a movable tubular rod, a brake stem, a hollow cylindrical body, said piston being mounted to and adjacent a free end of said movable tubular rod for movement in said cylindrical body, an opposite end of said tubular rod being connected with said brake stem whereby said tubular rod moves in said hollow cylindrical body and defines on opposite sides of said piston a first working volume and a second working volume, a central rod disposed inside said tubular rod, said tubular rod having at least one lateral opening connecting said second working volume and said first working volume to one another via at least one central passage between said tubular rod and said central rod formed by a relative difference in transverse dimensions between said central rod and an inside diameter of said tubular rod, said one opening being formed on said tubular rod a distance from said piston equal to at least one-half of the thickness of said piston, a stem guide closing an end of said cylindrical body and configured such that, during an expansion stroke and before the end of said expansion stroke displacing said piston along said cylindrical body toward said stem guide, said one opening formed on said tubular rod is sealed by an internal wall of said stem guide before all of the oil is evacuated from said second working volume toward said first working volume forming an oil pocket sufficiently thick to constitute a hydraulic cushion for said piston, said tubular rod having four openings connecting said second working volume and said first working volume to one another, said four openings being located a distance from the piston substantially equal to the thickness of the piston whereby said central passage is formed by a reduction in the diameter of said central rod at an end thereof that opens into said first working volume.

2. An oil brake according to claim 1 wherein the length of said stem guide is substantially equal to twice the thickness of said piston.

3. An oil brake comprising a piston, a movable tubular rod, a brake stem, a hollow cylindrical body, said piston being mounted to and adjacent a free end of said movable tubular rod for movement in said cylindrical body, an opposite end of said tubular rod being connected with said brake stem whereby said tubular rod moves in said hollow cylindrical body and defines on opposite sides of said piston a first working volume and a second working volume, a central rod disposed inside said tubular rod, said tubular rod having at least one lateral opening connecting said second working volume and said first working volume to one another via at least one central passage between said tubular rod and said central rod formed by a relative difference in transverse dimensions between said central rod and an inside diameter of said tubular rod, said one opening being formed on said tubular rod a distance from said piston equal to at least one-half of the thickness of said piston, a stem guide closing an end of said cylindrical body and configured such that, during an expansion stroke and before the end of said expansion stroke displacing said piston along said cylindrical body toward said stem guide, said one opening formed on said tubular rod is sealed by an internal wall of said stem guide before all of the oil is evacuated from said second working volume toward said first working volume forming an oil pocket sufficiently thick to constitute a hydraulic cushion for said piston, an end of said central rod protruding beyond said tubular rod in said first working volume, an expansion non-return stop valve being mounted on said central rod, an elastic means, said protruding central rod end including a head forming a support for said elastic means, said elastic means exerting a pressure on said non-return stop valve to support said non-return stop valve on a seat of a perforation on said free end of said tubular rod to seal an outlet of said one central passage opening into said first working volume and remote control means located adjacent said opposite end of said tubular rod enabling said central rod to translate relative to said tubular rod to adjust the pressure exerted by said elastic means on said expansion stop valve without disassembling the brake.

4. An oil brake according to claim 3 wherein said expansion stop valve comprises a generally cylindrical tube having a radial shoulder at one end, said expansion stop valve being attached to said central rod and slidable in said cylindrical seat at said free end of said tubular rod, the translation of said expansion stop valve toward the interior of said tubular rod being limited by a radial shoulder of said stop valve engageable on the end of said tubular rod thereby ensuring sealing of the outlet opening of said central passage into said first working volume, said expansion stop valve having at least one recess located in a plane containing a longitudinal axis of symmetry of said stop valve and having a depth that decreases from the end facing said radial shoulder in a direction toward said shoulder thereby ensuring gradual enlargement of said outlet of said one central passage opening into said first working volume upon translation of said expansion stop valve in a direction away from said cylindrical seat of said free end of said tubular rod.

5. An oil brake according to claim 3 wherein said piston has a generally tubular projection on a base thereof opposite said first working volume, said projection being generally concentric about an opening of said piston receiving said tubular rod and said central rod, said tubular projection operable to adjust the flow of oil passing through said one central passage during expansion to control said expansion.

6. An oil brake comprising a piston, a movable tubular rod, a brake stem, a hollow cylindrical body, said piston being mounted to and adjacent a free end of said movable tubular rod for movement in said cylindrical body, an opposite end of said tubular rod being connected with said brake stem whereby said tubular rod moves in said hollow cylindrical body and defines on opposite sides of said piston a first working volume and a second working volume, a central rod disposed inside said tubular rod, said tubular rod having at least one lateral opening connecting said second working volume and said first working volume to one another via at least one central passage between said tubular rod and said central rod formed by a relative difference in transverse dimensions between said central rod and an inside diameter of said tubular rod, said one opening being formed on said tubular rod a distance from said piston equal to at least one-half of the thickness of said piston, a stem guide closing an end of said cylindrical body and configured such that, during an expansion stroke and before the end of said expansion stroke displacing said piston along said cylindrical body toward said stem guide, said one opening formed on said tubular rod is sealed by an internal wall of said stem guide before all of the oil is evacuated from said second working volume toward said first working volume forming an oil pocket sufficiently thick to constitute a hydraulic cushion for said piston, an end of said central rod protruding beyond said tubular rod in said first working volume, an expansion non-return stop valve being mounted on said central rod, an elastic means, said protruding central rod end including a head forming a support for said elastic means, said elastic means exerting a pressure on said non-return stop valve to support said non-return stop valve on a seat of a perforation on said free end of said tubular rod to seal an outlet of said one central passage opening into said first working volume, an opposite end of said central rod protruding beyond said tubular rod in said brake stem and including a supplementary transverse bore housing an adjustment shaft, said adjustment shaft being housed in a transverse seat in said brake stem and in a bore of said central rod, said transverse seat being configured to enable limited translation of said adjustment shaft in the direction of the longitudinal axis of said central rod, opposite ends of said adjustment shaft protruding on opposite sides of said brake stem, respectively, said brake stem having threads for threadedly receiving a generally ring-shaped roller plug, said adjustment shaft being integral with said roller plug such that screwing and unscrewing said roller plug enables adjustment of the position of said adjustment shaft in said transverse seat enabling said central rod to translate relative to said tubular rod to adjust the pressure exerted by said elastic means on said expansion stop valve.

7. An oil brake according to claim 6 wherein said roller plug has threads cooperable with threads on said adjustment roller, said adjustment roller being ring-shaped and including means for blocking said adjustment shaft, said adjustment roller and said roller plug being shaped such that threading said adjustment roller and said roller plug relative to one another enables the ends of said adjustment shaft to be blocked between said adjustment roller and said roller plug.

8. An oil brake comprising a piston, a movable tubular rod, a brake stem, a hollow cylindrical body, said piston being mounted to and adjacent a free end of said movable tubular rod for movement in said cylindrical body, an opposite end of said tubular rod being connected with said brake stem whereby said tubular rod moves in said hollow cylindrical body and defines on opposite sides of said piston a first working volume and a second working volume, a central rod disposed inside said tubular rod, said tubular rod having at least one lateral opening connecting said second working volume and said first working volume to one another via at least one central passage between said tubular rod and said central rod formed by a relative difference in transverse dimensions between said central rod and an inside diameter of said tubular rod, said one opening being formed on said tubular rod a distance from said piston equal to at least one-half of the thickness of said piston, a stem guide closing an end of said cylindrical body and configured such that, during an expansion stroke and before the end of said expansion stroke displacing said piston along said cylindrical body toward said stem guide, said one opening formed on said tubular rod is sealed by an internal wall of said stem guide before all of the oil is evacuated from said second working volume toward said first working volume forming an oil pocket sufficiently thick to constitute a hydraulic cushion for said piston, said piston including an internal passage for communicating oil from said first working volume and said second working volume through passages located in the body of said piston, said internal passages being sealed by a deformable non-return washer during a compression stroke of said piston to enable flow of oil to a deformable backup chamber, to the outside of which chamber a gas is applied, whereby the oil is evacuated toward said backup chamber via at least two adjustable openings, each of which adjustable openings operates at a different stroke speed of the piston, said openings being arranged between an intermediate chamber of a predetermined volume and a backup chamber.

9. An oil brake according to claim 8 wherein oil is evacuated toward said backup chamber via three adjustable openings, a first opening of which is sealed by a first non-return stop valve adjustable to keep the oil from being evacuated except in response to a pressure exerted by said piston on the oil in excess of a predetermined pressure corresponding to nominal service conditions of the vehicle, a second opening of said three adjustable openings being sealed by a second non-return stop valve adjusted for a predetermined piston stroke speed between the low speeds and the hydraulic brake speeds, and a third opening of said adjustable openings having an adjustable throttle enabling evacuation of the oil at low speeds.

10. An oil brake according to claim 8 wherein said piston is threaded onto a threaded portion adjacent the free end of said movable tubular rod, said deformable non-return washer being locked onto one end of a rigid pre-loading washer resting on a radial shoulder formed on said movable tubular rod, and a face of said pre-loading washer opposite said non-return washer being substantially convex to enable said non-return washer to deform during compression of the brake whereby said non-return washer rests on said pre-loading washer.

11. An oil brake according to claim 8 wherein said deformable backup chamber is located in a reservoir carried on a hollow cylindrical body of the brake by a rigid connector.

* * * * *